US005466501A

United States Patent [19]

Logan et al.

[11] Patent Number: 5,466,501

[45] Date of Patent: * Nov. 14, 1995

[54] SIGN MAKING WEB WITH TACK KILLING OVERCOAT REMOVABLE BY WASHING AND RELATED METHOD

[75] Inventors: David J. Logan, Bloomfield; Leonard G. Rich, W. Hartford, both of Conn.

[73] Assignee: Gerber Scientific Products, Inc., Manchester, Conn.

[ * ] Notice: The portion of the term of this patent subsequent to Sep. 6, 2011, has been disclaimed.

[21] Appl. No.: 223,156

[22] Filed: Apr. 5, 1994

Related U.S. Application Data

[63] Continuation of Ser. No. 773,710, Oct. 9, 1991, Pat. No. 5,344,680.

[51] Int. Cl.$^6$ .................................................... B32B 3/00

[52] U.S. Cl. ............................ 428/40; 428/41; 428/137; 428/138; 428/213; 428/141; 428/220; 428/350; 428/354; 428/510; 428/511; 428/518; 428/520; 428/522

[58] Field of Search ................................ 428/40, 41, 42, 428/141, 350, 346, 354, 355, 343, 914, 913, 195, 202, 137, 131, 138, 514, 511, 507, 510, 518, 520, 522, 212, 213, 220, 218, 211; 40/595

[56] References Cited

U.S. PATENT DOCUMENTS

| | | | |
|---|---|---|---|
| 5,026,584 | 6/1991 | Logan | 428/41 |
| 5,236,751 | 8/1993 | Martin | 428/350 |
| 5,344,680 | 9/1994 | Logan | 428/40 |

*Primary Examiner*—Nasser Ahmad
*Attorney, Agent, or Firm*—McCormick, Paulding & Huber

[57] ABSTRACT

A laminated web has a carrier sheet and a sign material sheet superimposed on it and a first layer of permanently tacky adhesive attaching the sign material sheet to the carrier. A second permanently tacky adhesive layer is provided on the side of the sign material sheet facing away from the base layer and is coated or is provided with a film which deadens the exposed tacky surface such that the web may be cut in an automated sign generated machine and the web weeded thereby leaving free standing characters on which the second permanently tacky adhesive can then be exposed for application onto a substrate surface.

15 Claims, 6 Drawing Sheets

SIGN MAKING WEB WITH TACK KILLING OVERCOAT REMOVABLE BY WASHING AND RELATED METHOD

This is a continuation of application Ser. No. 07/773,710 filed on Oct. 9, 1991, now U.S. Pat. No. 5,344,680.

CROSS REFERENCE TO RELATED APPLICATIONS

The present invention relates to U.S. Pat. No. 5,026,584 issued to Logan on Jun. 25, 1991 and entitled SIGN MAKING WEB WITH DRY ADHESIVE LAYER and to the divisional application thereof now copending U.S. application Ser. No. 07/674,075 filed on Mar. 21, 1991, now abandoned and further relates to U.S. copending application Ser. No. 07/566,123, filed on Aug. 10, 1990, now U.S. Pat. No. 5,143,576 in the name of David Logan and entitled AUTOMATIC WEEDING SYSTEM AND METHOD OF USE, which patents being commonly assigned with the assignee of the present invention.

BACKGROUND OF THE INVENTION

This invention relates to a laminated web used for making signs having characters, symbols and the like, adhesively attached to a supporting surface, and deals more particularly with an improvement in such webs wherein characters and other shapes cut from one layer of a laminated web are readily transferred onto a support surface without need of a separate transfer tape to accomplish transfer and securement of the cut shapes to the substrate or support surface.

U.S. Pat. No. 4,467,525 issued to Logan et al. entitled AUTOMATED SIGN GENERATOR discloses an automated cutting machine in which a laminated web is fed lengthwise of itself across a cutting surface and a closed shape is cut into the web by a cutting tool carried on ways above it. The coordinated movement of the cutting tool taken in conjunction with the advancement of the web through the machine results in the cutting of a closed shape into the laminated web in accordance with encoded instructions issued by a computer that makes up part of the machine. The laminated web typically employs a carrier sheet or other like material which holds the sign material on it through the intermediary of an adhesive layer for advancement through the machine. In the advancement of the carrier material through the machine, it is advantageous to maintain the sign or "good" side of the material facing downwards and therefore protecting it against abrasion and scratches. This is especially important where vinyl is used and is easily scratched. As such, the upwardly facing side of the sign material sheet is required to carry the adhesive which will bond the cut shape to the underlying substrate surface if the cut shape is to be applied directly to the substrate surface from the carrier as disclosed in U.S. Pat. No. 5,026,584. By orienting the laminate in this manner to avoid using a transfer tape, a normally dry adhesive which is capable of being activated to a tacky condition is provided on the upwardly facing surface of the sign material sheet in accordance with the invention disclosed therein. However, it may at times in some applications of the web be desirable to use a permanently tacky adhesive rather than one which is one-time activated between a dry and a tacky condition as the means for attaching the cut shapes to the substrate surface. Nevertheless, cutting through an exposed tacky surface is not desirable because, among other things, during the resulting weeding operation, manipulating the web with the tacky surface exposed may inadvertently result in foreign material adhering to the cut shapes or result in portions of the web itself becoming bonded with one another. Also, since the web is often fed through the sign making machine from a feed roll, an exposed tacky surface would inhibit unwinding of the web, if not totally make it impossible.

Accordingly it is an object of the present invention to provide a laminated web wherein cut shapes are readily applied to a substrate surface through the intermediary of a permanently tacky adhesive having an outwardly disposed tacky surface which is initially deadened by the application of a dissolvable film or coating to it to condition the web for use in a cutting operation and which tack deadening substance is subsequently dissolved prior to applying the cut shape to a substrate surface.

It is a further object of the present invention to provide a low cost and reliable laminated web of sign material utilizing a permanently tacky adhesive to attach cut shapes to a substrate wherein the attaching adhesive is preconditioned so as to allow the web to be wound on itself in roll form.

Other objects and advantages of the invention will be apparent from the following disclosure and the appended claims.

SUMMARY OF THE INVENTION

A laminated web for use in making signs having cut shapes adhesively attached to a supporting surface comprises a web having a base layer of sheet material having a first face and an oppositely disposed second face and includes a layer of sign material in sheet form superimposed on the base layer and having a third face facing the base layer and a fourth face facing away from the base layer with the third face of the sign material being the good face of the sign material. A first layer of permanently tacky adhesive is interposed between the base and the layer of sign material with the adhesive of the first layer of permanently tacky adhesive adhering more strongly to the second face of the base layer than to the third face of the layer of sign material allowing the layer of sign material to be peeled from the first layer of permanently tacky adhesive with the adhesive of the first layer permanently tacky adhesive in the course of such peeling remaining on the base layer and coming completely free of the third face of the sign material. The web further includes a second layer of permanently tacky adhesive superimposed on the fourth face of the sign material with the second layer of permanently tacky adhesive defining an outwardly directed tacky surface facing away from the layer of sign material. The adhesive of the second layer of permanently tacky adhesive having a more aggressive tack than the adhesive of the first layer of permanently tacky adhesive. A means is formed on the outwardly facing tacky surface of the second-layer of permanently tacky adhesive for temporarily deadening the tack of the outwardly disposed tacky surface of the second adhesive layer yet allowing the tacky characteristic of the outwardly disposed surface to be regenerated by the application of a suitable solvent capable of dissolving the adhesive deadening means.

The invention further resides in a method for making a sign from a web of the aforementioned type by cutting a closed shape through the deadening means, the second adhesive layer and through the layer of sign material and no more than partially into the base layer; separating the portion of the layer of sign material containing the closed shape from the remainder of the sign material; removing that part of the portion of the sign material not included in the closed shape to leave the closed shape on the base layer in a free standing form; washing off the deadening means overlapping the closed shape by applying a solvent to it to expose the underlying tacky outwardly disposed surface of the second permanently tacky layer of adhesive; attaching the closed shape to a supporting surface by placing the web against a supporting surface with the outwardly disposed surface of the second permanently tacky layer of adhesive facing the supporting surface; and pressing the closed shape toward the supporting surface by a force applied to the first face of the base layer in the area overlapping the closed shape then peeling the web from the supporting surface to remove the closed shape from the remainder of the web-and to leave it attached to the supporting surface due to the adhesive effect of the second layer of permanently tacky adhesive.

Figure 2:
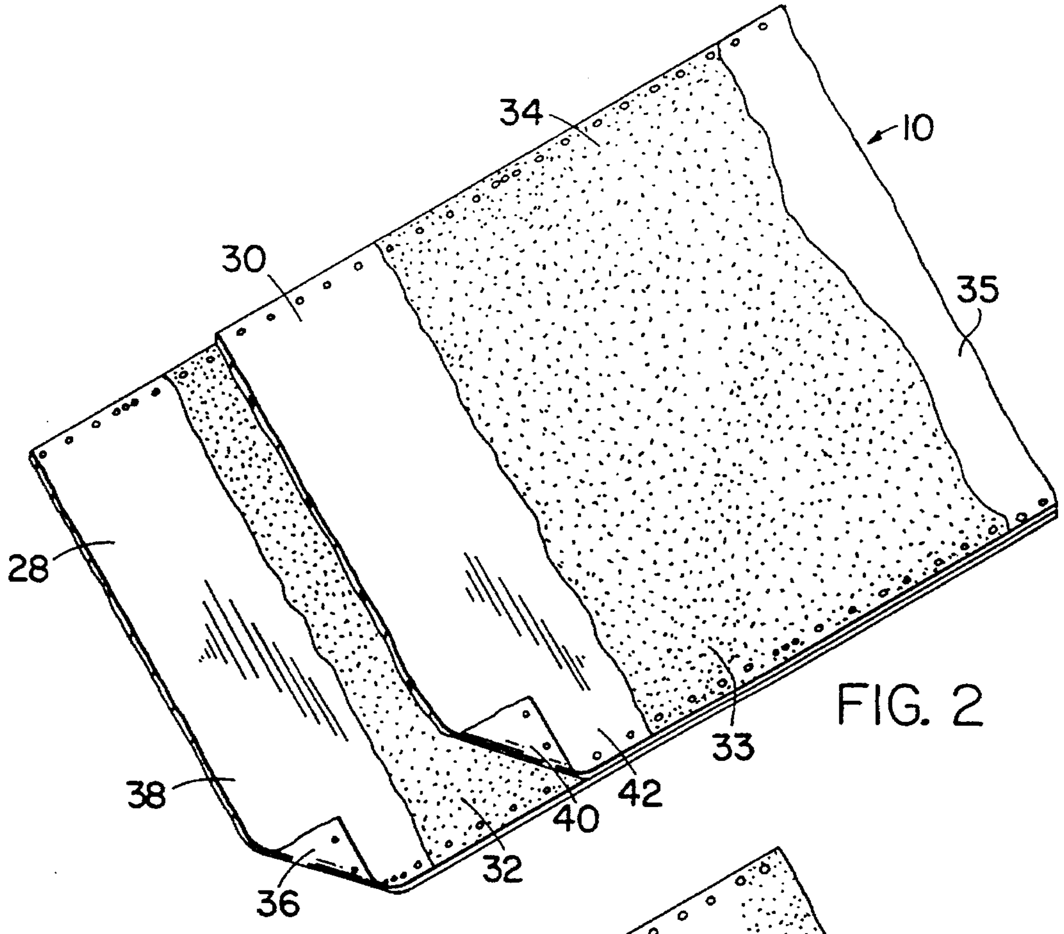
FIG. 2 is a perspective view of a portion of the web of FIG. 1 with parts of the various layer being broken away to reveal underlying layers.

FIGS. **9*a* and 9*b* illustrate schematically different embodiments of ways of applying the tack deadening means to form the web of FIG. 2**.

DETAILED DESCRIPTION OF THE PREFERRED EMBODIMENT

Figure 1:
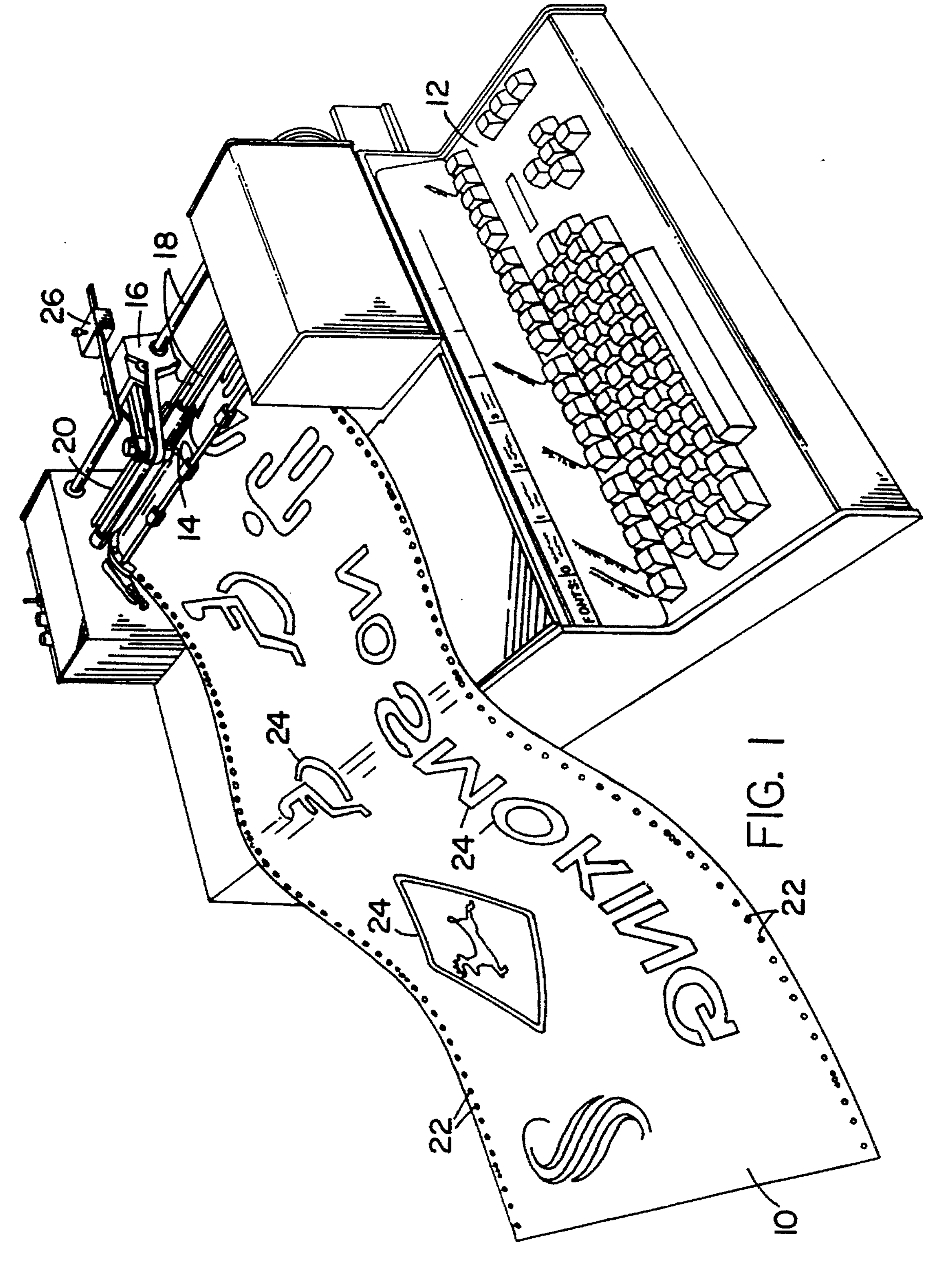
FIG. 1 is a perspective view showing a laminated web embodying this invention in the process of being cut on an automated sign making machine.

In FIG. 1 a web embodying the invention is illustrated at 10 and is shown in the process of being cut by an automated sign generating machine, such as that shown in U.S. Pat. No. 4,467,525, to which reference may be made for further details of its construction. The machine 12 includes a knife 14 for cutting the web 10 mounted on a carriage 16 transversely of the web's length by sliding on two guide rails 18,18 and being driven transversely by a drive motor through an intermediary of a cable drive 20. Movement in the longitudinal or lengthwise extent of the web is effected by a pair of drive sprockets (not shown) which engage with feed holes 22,22 located on opposite sides of the web along marginal edge portions therealong for positively moving the web through the machine 12. The area of the web existing between the two marginal edge portions is the work area of the web where the characters 24,24 are created. Therefore, by combined movement of the web in the longitudinal coordinate direction and the carrier in the transverse coordinate direction, the knife 14 is caused to cut any desired line on the work area of the web to produce cut characters, symbols or other shapes, such as shown at 24 in FIG. 1. The knife is responsible for cutting such characters and the machine 12 includes a counter weight 26 which controls the pressure of the knife on the web. This enables the depth of penetration of the blade to be adjusted and held at a substantially consistent value as will be further explained in greater detail with reference to FIG. 3 wherein it is shown that the web is cut through less than the full extent of its thickness.

Figure 3:
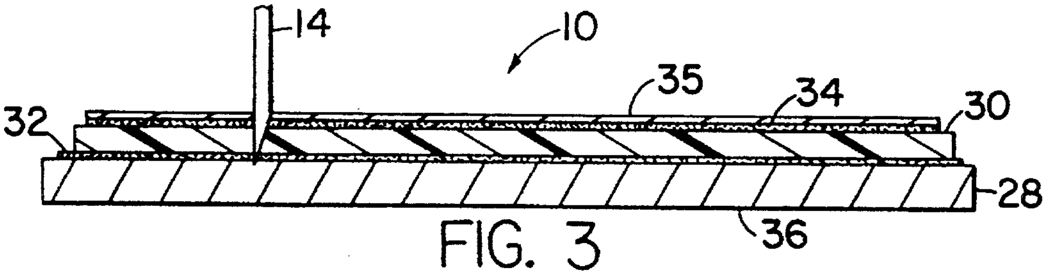
FIG. 3 is a fragmentary vertical sectional view taken through the web of FIG. 1 wherein the thickness of the various layers have been exaggerated for clarity, the view showing the degree of penetration of the knife during the cutting of the web.

In accordance with the invention, FIGS. 2 and 3 illustrate the construction of the web of FIG. 1. The web 10 is comprised of a base layer or carrier sheet 28 and a superimposed sheet of sign material 30 carried by it. The web 10 has a first layer of permanently tacky adhesive 32 interposed between the base layer 28 and the layer of sign material 30. The web 10 is provided in accordance with the invention with a second permanently tacky adhesive layer 34 on the top of the layer of sign material 30 and the outwardly disposed surface 33 of this adhesive layer is provided with a means 35 removably covering the otherwise exposed tacky surface 33 effectively killing or deadening the tack of the second adhesive layer until such time as it is needed. The material selected for the sheets 28 and 30 and for the adhesive layers 32 and 34 may vary, but in the preferred embodiment are those set out in table A-1 below.

TABLE A-1

| Material Name | Material Type | Thickness |
|---|---|---|
| base layer 28 | heavy paper 80 pound stock | 8–10 mils |
| sign layer 30 | colored flexible plastic i.e. polyvinylchloride | 2–4 mils |
| first adhesive layer 32 | rubber or acrylic permanently tacky or pressure sensitive | 1–2 mils |
| second adhesive layer 34 | rubber or acrylic permanently tacky or pressure sensitive | 2–4 mils |

As seen in FIG. 2 the base layer 28 has a first face 36 and a second face 38 and the layer of sign material 30 has a first face 40 and a second face 42. The first faces 36 and 40 face downwards and the second faces 38 and 40 face upwards taken relative to the manner in which the web is fed through the machine 12. The first face 40 is the better appearing or "good" face of the sheet material as it will be the face seen on the finished sign. The good face 40, in the case where the sign material is formed from a commonly available polyvinylchloride sheet of material, has a relatively smoother glossy finish which also serves as a release surface as will be appreciated hereinafter in accordance with one aspect of the invention. For the moment, it is only necessary to appreciate that the sign or good face being disposed downwards in contact with the permanently tacky adhesive 32 is protected from scratching or marring during the cutting operation.

Each of the carrier sheet 28 and the sign material sheet 30 is adapted to strongly bond and thus remain attached to the one of the first and second adhesive layers associated with it. That is, the carrier sheet 28 is formed from a fibrous material, such as paper, which readily nonreleasably bonds to the first adhesive layer 32 while the back or second face 42 of the sign material sheet 30 is roughened or has a nonglossy face which readily lends itself to being nonreleasably bonded to the second permanently tacky adhesive layer 34. The first adhesive layer 32 is sandwiched between the carrier layer 28 and the sign material 30 layer and releasably attaches to the sign material layer through the intermediary of the glossy face 40 serving as the release surface therebetween. Thus, the first adhesive layer 32 and the associated adherent faces 38 and 40 are so related that this adhesive bonds more strongly to the face 38 than to the face 40. Further, the interface between the first adhesive layer 32 and the face 40 is such that the sign material of the layer 30 may be peeled from the adhesive layer 32 with the adhesive in the course of this peeling coming entirely free from the sign surface 40 and the remaining on the surface 38 of the base layer 28.

The relative pull strengths of the adhesive layers 32 and 34 are so selected relative to one another that the bonding force between the second adhesive layer 34 and both the face 42 of the sign material and the supporting surface will be greater than the bonding force between the face 40 and the first adhesive layer 32. This relationship of bonding strengths may be achieved by using an adhesive of greater tackiness for the layer 34 than that of the layer 32, and alternatively by making the first layer a relatively thin layer of adhesive sparsely distributed on the surface 38 while making the second layer 34 a relatively thick layer using more adhesive per unit area than that provided on the surface 38. The desired relationship of bonding strengths may also be obtained or enhanced by providing the face 40 of the layer of sign material with a film of release agent or otherwise conditioning it so as to yield a very low bonding strength between it and the adhesive layer 32 thus making the layer of sign material easily peeled from the confronting adhesive layer.

Figure 9A:
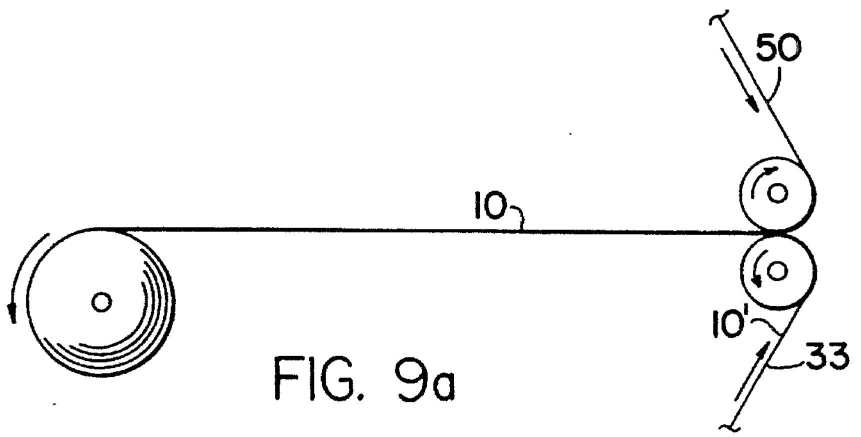
Figure 9B:
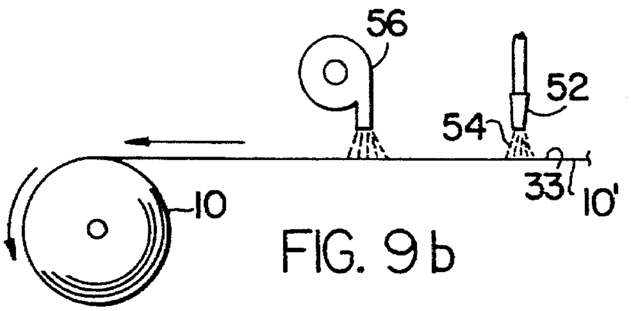

To cause the upper surface 33 of the tacky layer 34 to be killed for purposes of winding the web on itself in consecutive turns and for conditioning the web for use in a cutting operation, the means 35 may be applied to it in one of the two ways shown in FIGS. **9*a* and 9*b* depending on the form of material used. Referring first to FIG. 9*a*, it should be seen that the unconditioned web .referred to as 10' is advanced with its tacky surface 33 outwardly exposed so as to be engaged by and bond with the adhesive deadening means 35. The means 35 in this example is comprised of a thin film of material 50 in sheet form which is caused to be superimposed on and held in place by the tacky exposed surface 33 of the web 10' as the two lengths are joined. Alternatively, as shown in FIG. 9*b*, the means 35 may be a coating of material 54 applied in liquid form in an evaporative solution by a sprayer 52 to the exposed tacky surface 33 of the unconditioned web 10' on which surface it thereafter becomes bonded. The coating 54 may be air cured by a dryer blower 56** provided downstream of its application for this purpose.

The material making up the means 35 is capable of being substantially dissolved by the application of a given solvent applied to it, but which solvent being selected such that it does not adversely affect the tacky characteristic of the underlying surface 33 of the second adhesive layer 34 when applied. For cooperating with the adhesive layer 34in this manner when the adhesive layer 34 is formed from a standard acrylic adhesive as in the case with the layer 34, the solvent selected for reacting with the tack deadening means 35 is preferably water. The material making up either the film 50 or the coating 54 may take many forms, but in the preferred embodiment it is one of the materials listed below in TABLE A-2.

TABLE A-2

| Material Type | Applied Thickness (Approximation) | Solvent | Applied Form |
|---|---|---|---|
| Polyvinyl Alcohol (PVA) | 1.5 mils or less | Water | Spray or Film |
| Polyvinyl Pyrrolidone (PVP) | 1.5 mils or less | Water | Spray or Film |

Figure 4:
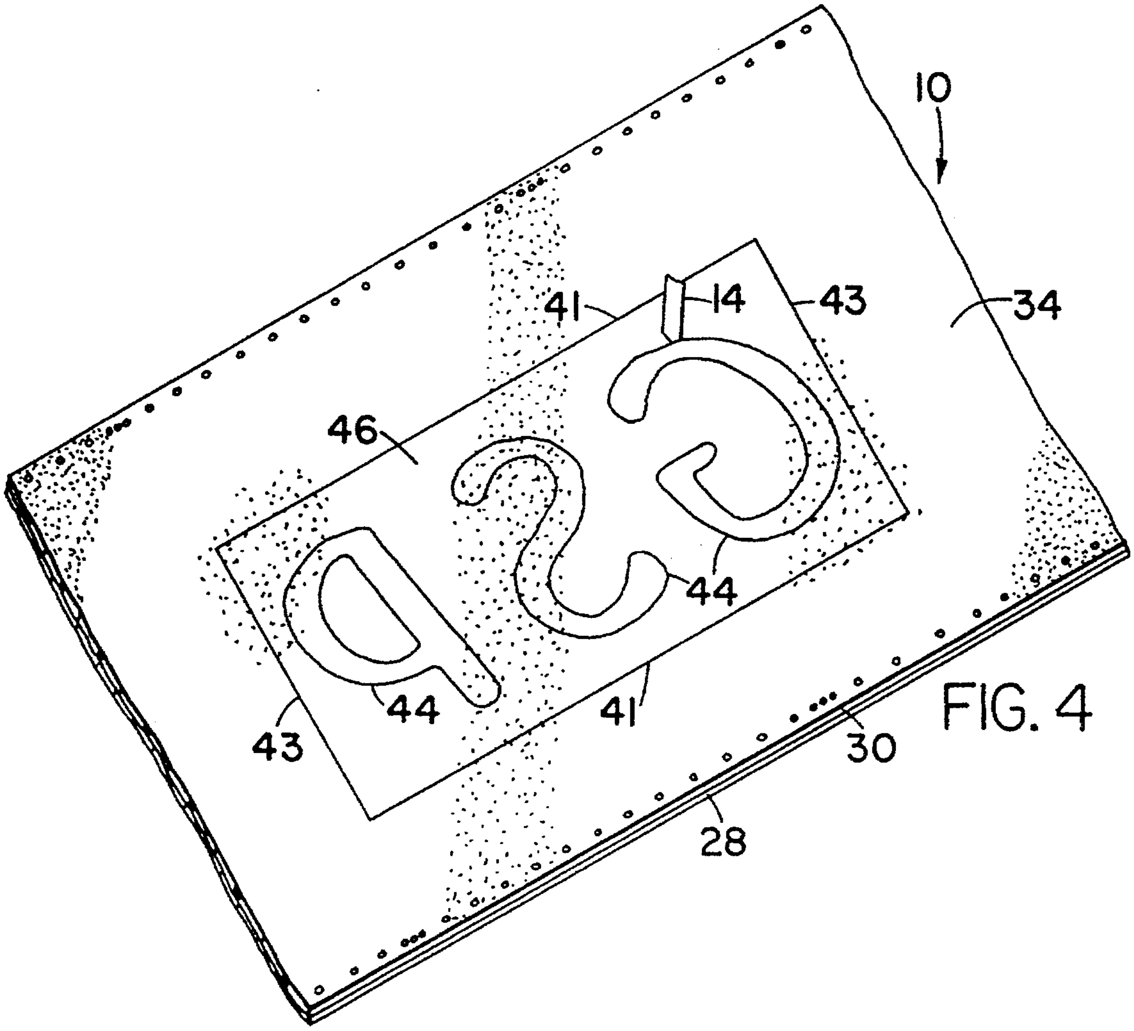

Referring now to FIGS. 4 through 8, and to the manner in which the previously described web is used to construct a sign on a given surface, it should be seen that the first step shown in FIG. 4 is to cut one or more shapes 44,44 into the web using the blade 14. The shapes are cut in the reverse or mirror images of the desired shapes so that upon application to a substrate surface, the proper orientation is effected. The blade 14, as previously mentioned, is suspended above the web 10 in the sign machine 12 and is applied to the web with a downward force selected by the appropriate adjustment of the counterweight 26 such that the blade extends entirely through the coating or film of the means 35, through the second adhesive layer 34 and through the layer of sign material 30 during the cutting process, but penetrates at its tip only slightly, if at all, into the base layer 28. As a result, the cut characters 44,44 being closed shapes are completely separated from the remainder or the weed of the layer of sign material. These characters are nevertheless held in place by the uncut base layer 28 and the adhesive layer 32 interposed therebetween. As illustrated in FIG. 4, after or before the characters 44 are cut, a portion 46 of the layer of the sign material which contains the characters 44,44 may be cut along the boundary lines 41,43 to separate it from the remainder of the layer 30. As an alternative to scribing the boundary lines 41,43 with the blade 14, the web itself could be cut along such lines as 41 and 43 such that a portion of the web bounded by these margins is completely separated from remaining web material.

Figure 5:
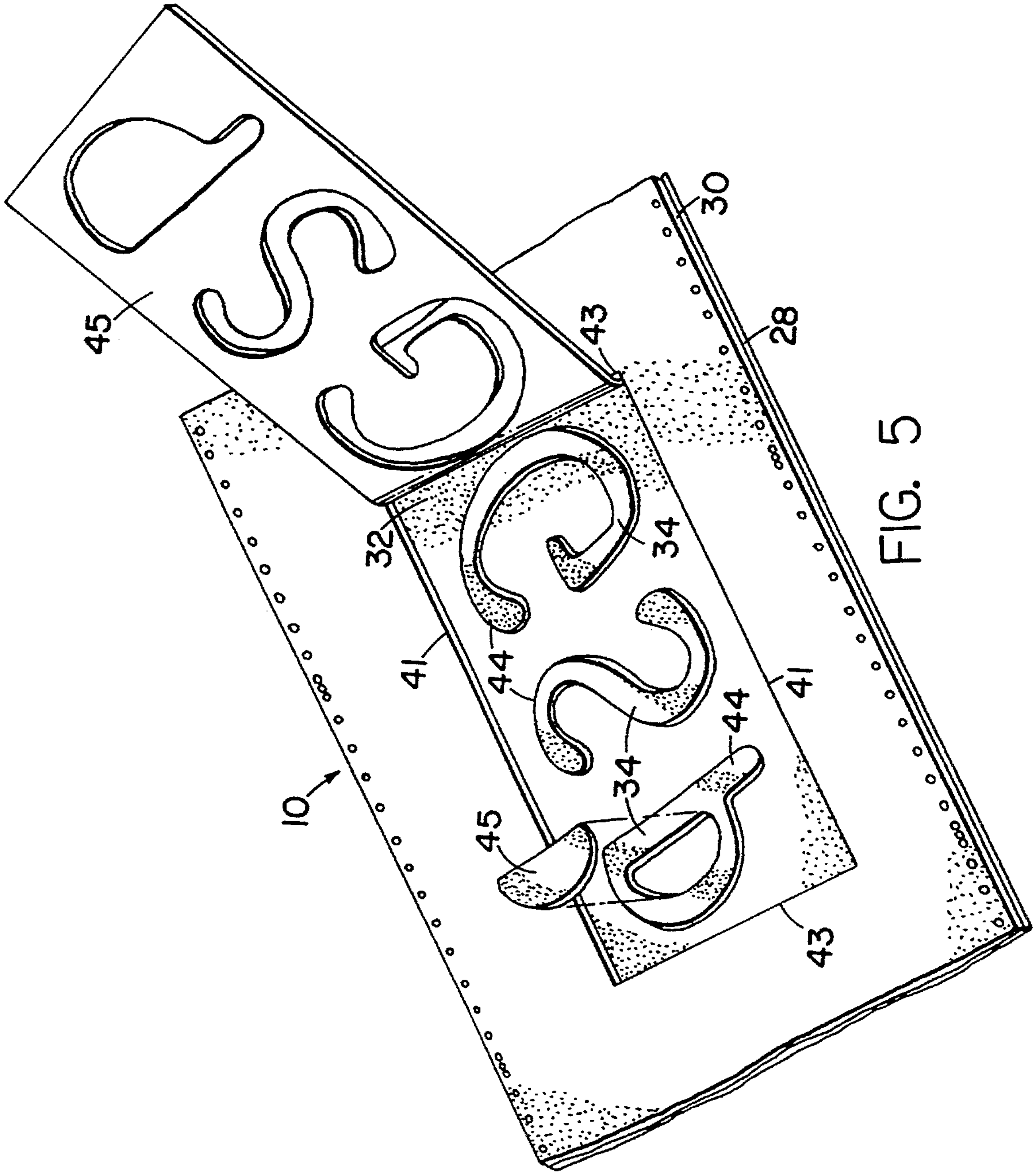

Referring to FIG. 5 and to the next step in the sign making process, waste material 45 constituting the material of the layer 30 falling within the boundary lines 41,43 but not forming part of the characters, is weeded from the laminate 10 leaving behind on the base 28 the characters 44,44 in free standing form. Tweezers or other pointed pick-type tools may conveniently be used to efficiently preform the weeding process. It should be appreciated here that the tack deadening means 35 having conditioned the otherwise exposed tacky surface 33 in a manner heretofore discussed, permits weeding without interference from an otherwise tacky exposed surface.

Figure 6:
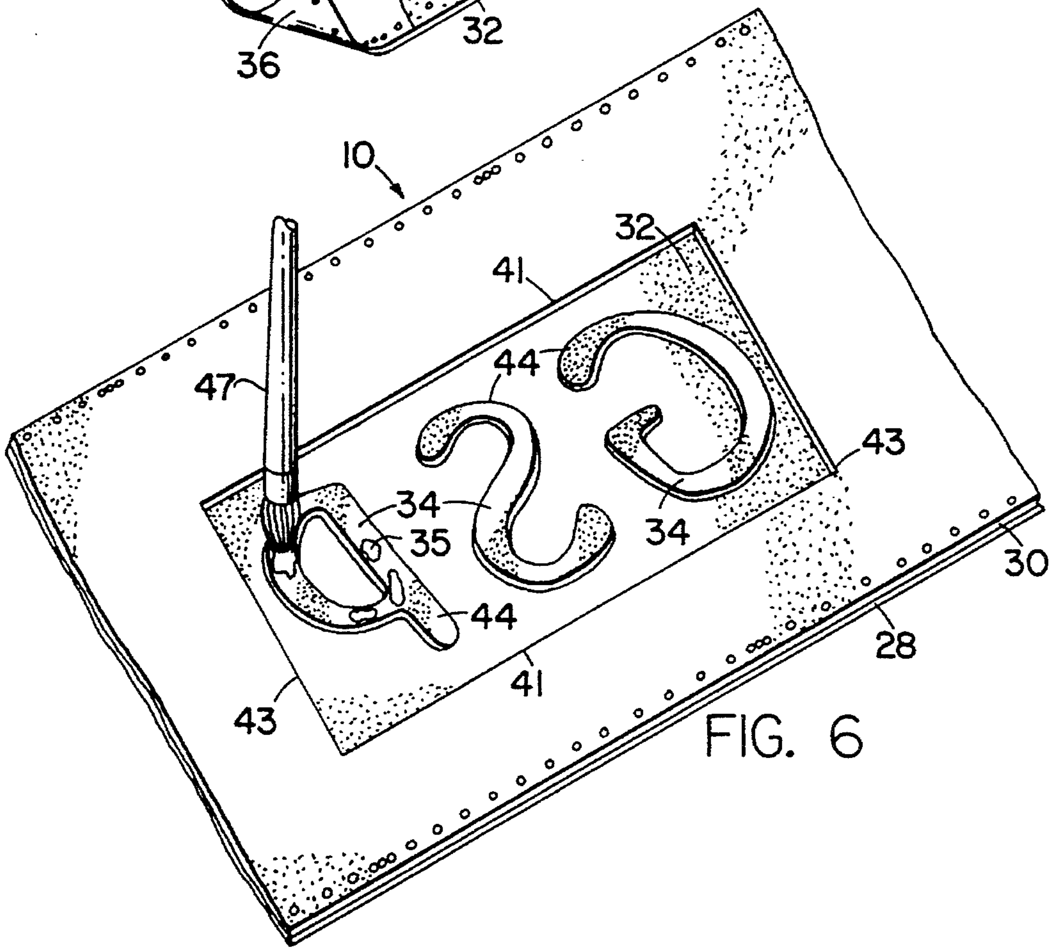
FIGS. 4 through 8 are views showing a portion of the web of FIG. 1 and illustrating in sequence the steps followed in using the web to create a sign.

Referring now to FIG. 6 it should be seen that after the weeding operation is complete, the cut closed shapes 44 remain as free standing shapes separated from one another by the spacing dictated by the software employed for cutting the characters. It is important here to realize that the web of the present invention allows the characters after being cut in a mirrored image to be applied directly to the substrate surface in exactly the same spacing generated by the cutting machine 12 using the base layer 28. Where the material selected for the means 35 is one such as set forth in TABLE A-2, a brush 47 or other suitable solvent applying tool, such as a sponge, may be used to apply water enough to wash off the coating or film of the means 35. It is noted that in the case where the boundary lines 41 and 43 are used to separate the characters 44 from the remaining web material, each boundary line is spaced sufficiently far enough away from the characters or shapes that the solvent applied to the exposed surfaces of the characters may be activated without inadvertently contaminating the coating or film of the means 35 disposed on the material outside the boundary lines 41,43.

Figure 7:
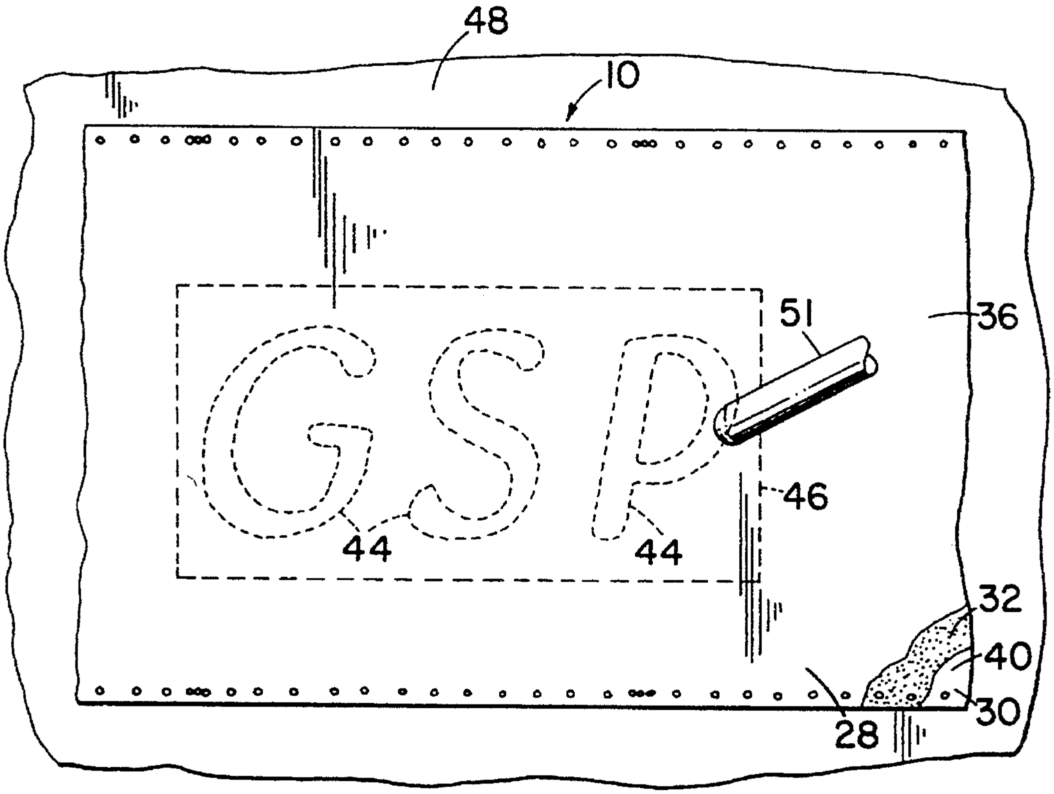

With this, the web 10 is then transferred to and laid against a supporting surface 48 as shown in FIG. 7. The characters 44 cut from the layer 30 of the sign material are then firmly adhered to the supporting surface by pressing the web 10 against that surface by means of a force applied to the base layer 28 in the area overlying the characters 44,44. Such force may be accomplished by pressing the base layer 28 with the thumb or index finger of the user or by burnishing it with a tool 51 as shown in FIG. 7.

Figure 8:
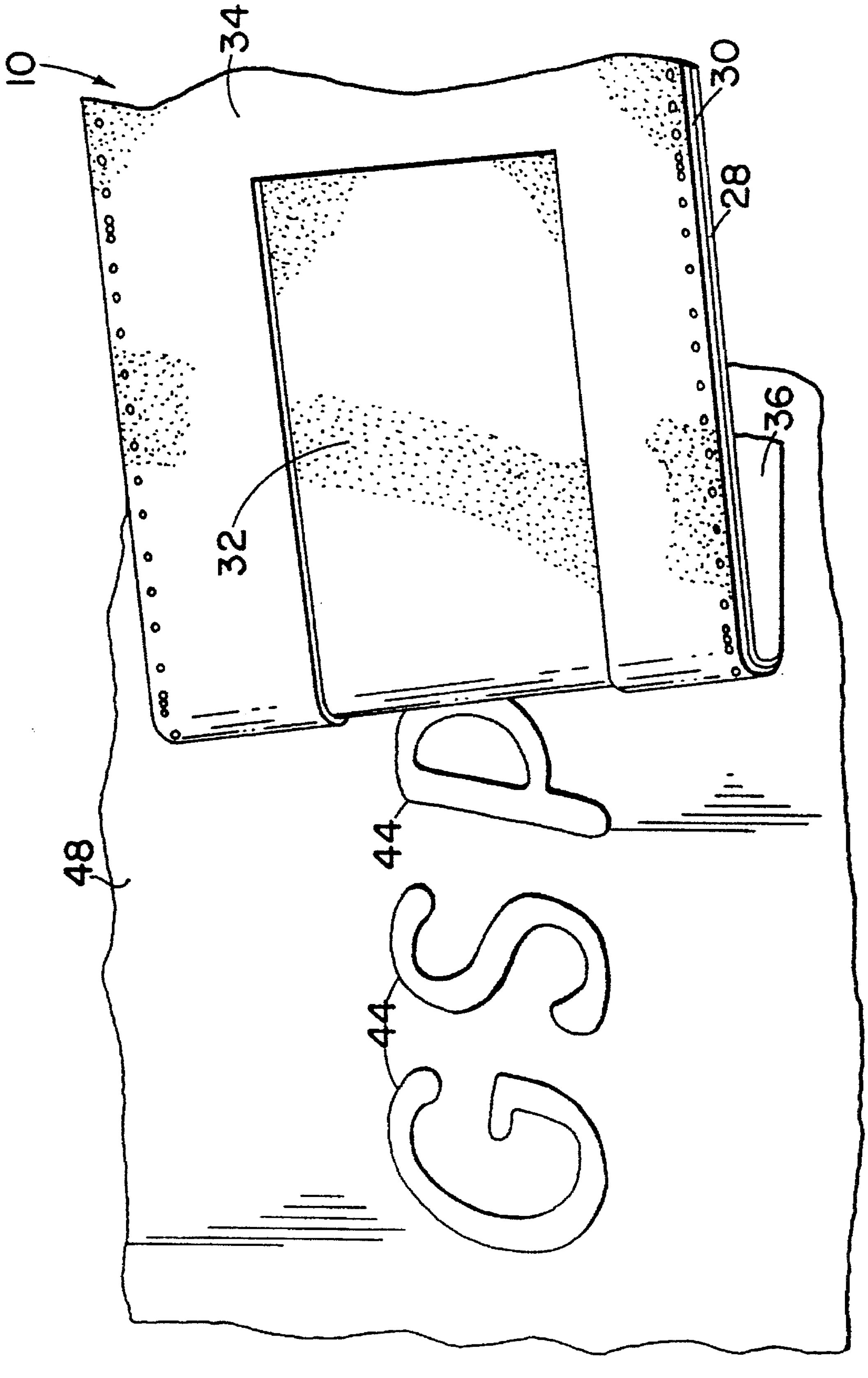

In the last step of construction, as illustrated in FIG. 8, the base layer 28 is peeled from the support surface 48 leaving behind the characters 44,44 now adhered to that surface. This is made possible by the bonding forces between the adhesive layer 32 and the involved adherent surfaces. As needed, the characters after being transferred to the supporting surface 48 may again be pressed downward using a roller or other pressing means to obtain a still stronger bond.

By the foregoing, an improved laminated web has been disclosed. However, numerous modifications and substitutions may be had without departing from the spirit of the invention. For example, the marginal edge portions of the web could be formed without the openings 22 such that it is adapted to be gripped along these marginal edge portions in a suitable drive mechanism.

Accordingly the invention has been described by way of illustration rather than by limitation.

We claim:

1. A laminated web for use in making signs having cut shapes adhesively attached to a supporting surface, said web comprising:

a base layer of sheet material having a first face and an oppositely disposed second face;

a plastic layer of sign material in sheet form superimposed on said base layer and having a third face facing said second face of said base layer and a fourth face facing away from said base layer, said third face of said sign material being a good or glossy face of said sign material, said fourth face of said sign material being a non-glossy or roughened face of said sign material;

a first layer of permanently tacky adhesive interposed between said base and said layer of sign material;

said adhesive of said first layer of permanently tacky adhesive adhering more strongly to said second face of said base layer than to said third face of said layer of sign material allowing said layer of sign material to be peeled from said first layer of permanently tacky adhesive with the adhesive of said first layer permanently tacky adhesive in the course of such peeling remaining on said base layer and coming completely free of said third face of said sign material;

a second layer of permanently tacky adhesive superimposed on said fourth face of said sign material with said second layer of permanently tacky adhesive defining an outwardly directed tacky surface facing away from said layer of sign material;

the adhesive of said second layer of permanently tacky adhesive having a more aggressive tack than said adhesive of said first layer of permanently tacky adhesive; and a layer of water soluble vinyl polymer formed on the outwardly facing tacky surface of said second layer of permanently tacky adhesive for temporarily deadening the tack of the outwardly disposed tacky surface of said second adhesive layer yet allowing the tacky characteristic of said outwardly directed surface to be regenerated by the application of water capable of dissolving said water soluble vinyl polymer layer, said second layer of permanently tacky adhesive being of such a tackiness when exposed that when a) a closed shape is cut in the laminated web by cutting through a said water soluble vinyl polymer layer through said second adhesive layer and said layer of sign material and no more than partially into said base layer, b) the surrounding portions of said closed shape of the layer of sign material defining the closed shape are removed, c) the adhesive of said second layer of permanently tacky adhesive overlapping the closed shape is thereafter exposed by applying an appropriate solvent to the water soluble vinyl polymer layer and bringing the exposed outwardly directed tacky surface of said second adhesive layer into engagement with a supporting surface, d) the adhesive of said second permanently tacky layer being pressed downwards toward the supporting surface by a force applied to said first face of said base layer in the area overlapping the closed shape, and e) the remainder of said web is then peeled from the supporting surface the portion of the layer of sign material defining the closed shape will remain on the supporting surface and be free of the remainder of the web due to the relative adhesive strengths of the first and second adhesive layers and the adherent properties of the supporting surface taken relative to the third face of the sign material.

2. A laminated web as defined in claim 1 wherein said laminated web along each marginal side edge includes portions engagable with an automated sign maker to drive it in coordinated movement with a cutting tool to cut a desired shape through the layer of water soluable vinyl polymer, through the second adhesive layer and through the sign material yet only partially cutting into said base layer.

3. A laminate web as defined in claim 2 further characterized in that said layer of water soluable vinyl polymer material is bonded to the web through the intermediary of the outwardly disposed tacky surface of said second permanently tacky adhesive layer.

4. A laminate web as defined in claim 3 further characterized in that said water soluable vinyl polymer is formed from a thin coating of polyvinyl alcohol applied to the outwardly disposed tacky surface of said second permanently tacky adhesive by spraying.

5. A laminated web as defined in claim 3 further characterized in that said water soluable vinyl polymer is formed from a thin film of polyvinyl alcohol applied in sheet form to the outwardly disposed tacky surface of said second permanently tacky adhesive.

6. A laminated web as defined in claim 4 further characterized in that said thin coating of polyvinyl alcohol has a thickness of less than or equal to 1.5 mils.

7. A laminated web as defined in claim 5 further characterized in that said film has a thickness less than or equal to 1.5 mils.

8. A laminated web as defined in claim 3 further characterized by said water soluble vinyl polymer being comprised of a thin film of polyvinyl pyrrolidone applied in sheet form over and adhered to the outwardly disposed tacky surface of said second permanently tacky adhesive layer.

9. A laminated web as defined in claim 3 further characterized by said water soluable vinyl polymer being comprised of a thin coating of polyvinyl pyrrolidone applied by spraying the outwardly disposed tacky surface of said second permanently tacky adhesive layer.

10. A laminated web as defined in claim 8 further characterized in that said thin film of polyvinyl pyrrolidone has a thickness less than or equal to 1.5 mils.

11. A laminated web as defined in claim 9 further characterized in that said thin coating of polyvinyl pyrrolidone has a thickness of less than or equal to 1.5 mils.

12. A laminated web as defined in claim 2 further characterized in that said marginal side edge portions include a row of feed holes in each of side edge cooperating with an associated sprocket in the sign making machine.

13. A laminated web as defined in claim 1 further characterized by said base being formed from paper.

14. A laminated web as defined in claim 13 further characterized by said plastic of said layer of sign material being polyvinylchloride.

15. A laminated web as defined in claim 14 further characterized in that said third face of said layer of sign material has a release agent formed on it which release agent being a silicone material.

* * * * *